United States Patent
Eldering et al.

(10) Patent No.: US 6,684,194 B1
(45) Date of Patent: *Jan. 27, 2004

(54) SUBSCRIBER IDENTIFICATION SYSTEM

(75) Inventors: Charles A. Eldering, Doylestown, PA (US); M. Lamine Sylla, New Britain, PA (US)

(73) Assignee: Expanse Network, Inc., Pipersville, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/452,893

(22) Filed: Dec. 2, 1999

Related U.S. Application Data
(60) Provisional application No. 60/110,770, filed on Dec. 3, 1998.

(51) Int. Cl.[7] .............................................. G06F 17/60
(52) U.S. Cl. ............................... 705/10; 705/1; 705/14; 725/9; 725/10; 725/42; 345/75; 386/83
(58) Field of Search .......................... 705/1, 7, 10, 14; 345/745; 386/83; 725/9, 10, 42, 35

(56) References Cited

U.S. PATENT DOCUMENTS

| | | | |
|---|---|---|---|
| 4,258,386 A | 3/1981 | Cheung | 358/84 |
| 4,546,382 A | 10/1985 | McKenna et al. | 358/84 |
| 4,779,198 A | 10/1988 | Lurie | 364/419 |
| 4,833,308 A * | 5/1989 | Humble | 235/383 |
| 4,905,080 A * | 2/1990 | Watanabe et al. | 725/14 |
| 5,155,591 A | 10/1992 | Wachob | 385/86 |
| 5,223,924 A | 6/1993 | Strubbe | 358/86 |
| 5,848,396 A | 12/1998 | Gerace | 705/10 |
| 5,918,014 A | 6/1999 | Robinson | 395/200.49 |
| 5,974,396 A * | 10/1999 | Anderson et al. | 705/10 |
| 5,977,964 A | 11/1999 | Williams et al. | 725/46 |
| 5,991,735 A | 11/1999 | Gerace | 705/10 |
| 6,055,510 A | 4/2000 | Henrick et al. | 705/14 |
| 6,177,931 B1 | 1/2001 | Alexander et al. | 345/327 |
| 6,216,129 B1 | 4/2001 | Eldering | 707/10 |
| 6,285,983 B1 * | 9/2001 | Jenkins | 705/10 |
| 6,298,348 B1 * | 10/2001 | Eldering | 707/10 |
| 6,393,407 B1 * | 5/2002 | Middleton, III et al. | 705/14 |

(List continued on next page.)

FOREIGN PATENT DOCUMENTS

| | | |
|---|---|---|
| WO | 9904561 | 1/1999 |
| WO | 0014951 | 3/2000 |
| WO | 0033224 | 6/2000 |

OTHER PUBLICATIONS

IEEE Publication "A framework for Targeting Banner Advertising on the Internet", by Gallagher, K. and Parsons, J., Jan. 1997, 12 pages.

(List continued on next page.)

*Primary Examiner*—Eric W. Stamber
*Assistant Examiner*—Raquel Alvarez
(74) *Attorney, Agent, or Firm*—Douglas J. Ryder

(57) ABSTRACT

A subscriber identification system is presented in which subscriber selection data including channel changes, volume changes, and time-of-day viewing information is used to identify a subscriber from a group of subscribers. In one instance, the subscriber viewing data is recorded and a signal processing algorithm such as a Fourier transform is used to produce a processed version of the subscriber selection data. The processed version of the subscriber selection data can be correlated with stored common identifiers of subscriber profiles to determine which subscriber from the group is presently viewing the programming. A neural network or fuzzy logic can be used as the mechanism for identifying the subscriber from clusters of information which are associated with individual subscribers.

61 Claims, 12 Drawing Sheets

U.S. PATENT DOCUMENTS

| | | | | |
|---|---|---|---|---|
| 6,457,010 B1 | * | 9/2002 | Eldering et al. | 707/10 |
| 6,460,036 B1 | * | 10/2002 | Herz | 707/10 |
| 6,463,585 B1 | * | 10/2002 | Hendricks et al. | 725/35 |
| 2001/0004733 A1 | | 6/2001 | Eldering | 705/14 |

OTHER PUBLICATIONS

Product Literature, Aptex Software Inc., "SelectCast for Ad Servers", printed from the World Wide Web site http://www.aptex.com./products–selectcast–commerce.htm on Jun. 30, 1998, 4 pp.

Product Literature, Imgis Inc., "AdForce", printed from the World Wide Web site http://www.starpt.com/core/ad_Target.html on Jun. 30, 1998, 5 pp.

U.S. patent application No. 09/449,887 filed on Nov. 30, 1999 entitled "Smart Agent Based on Habit, Statistical Inference and Psych–Demographic Profiling". Invented by Henry Yuen.

* cited by examiner

| | | SESSION VALUE |
|---|---|---|
| CATEGORY | CATEGORY 1<br>CATEGORY 2<br>⋮<br>CATEGORY K | 1<br>0<br>⋮<br>1 |
| SUB-CATEGORY | SUB-CATEGORY 1<br>SUB-CATEGORY 2<br>⋮<br>SUB-CATEGORY L | 1<br>0<br>⋮<br>0 |
| CONTENT | CONTENT 1<br>CONTENT 2<br>⋮<br>CONTENT P | 1<br>1<br>⋮<br>0 |
| PROGRAM TITLE | PROGRAM TITLE 1<br>PROGRAM TITLE 2<br>⋮<br>PROGRAM TITLE Q | 1<br>0<br>⋮<br>0 |
| CHANNEL CHANGE | 1ST MINUTE<br>2ND MINUTE<br>⋮<br>10TH MINUTE | 2<br>2<br>⋮<br>0 |
| VOLUME LEVEL | MUTE<br>1-4<br>5-7<br>8-10 | 0<br>0<br>1<br>0 |
| AGE | 4-10<br>11-14<br>⋮ | 0<br>1<br>⋮ |
| GENDER | M<br>F | 0<br>1 |

FIG. 3

IF PROB (GENDER = FEMALE) $\geq 0.7$ AND PROB (CATEGORY=SOAP OPERA) $\geq 0.7$
    SET   GENDER = FEMALE
IF PROB (GENDER = MALE) $\geq 0.7$ AND PROB (CATEGORY = SPORT) $\geq 0.7$
    SET   GENDER = MALE

*FIG. 8*

RECORD [SEQUENCE]; /* STORE SUBSCRIBER SELECTION DATA I.E.
CHANNEL CHANGE AND VOLUME CHANGE */

F_T_SEQ= FOURIER [SEQUENCE]; /* COMPUTE FOURIER TRANSFORM OF
SEQUENCE */

FOR I = 1 TO N
    BEGIN
        COR_VAL(I)= CORRELATE [F_T_SEQ, COM_IDENT (I)];
        /* COM_IDENT (I) REPRESENTS THE COMMON
        IDENTIFIER OF THE $I^{TH}$ SUBSCRIBER PROFILE */

STORE COR_VAL (I);
    END $$SUB\_ID = ARG \left\{ \underset{I}{MAX} (COR\_VAL (I)) \right\};$$

/* SUBSCRIBER W/ MAX CORRELATION VALUE W/ F_T_SEQ IS
IDENTIFIED */

*FIG. 10*

SUBSCRIBER IDENTIFICATION SYSTEM

Priority of Provisional Application Serial No. 60/110,770 filed Dec. 3, 1998 is hereby claimed.

BACKGROUND OF THE INVENTION

The ability to direct specific advertisements to subscribers of entertainment programming and users of on-line services is dependent on identifying their product preferences and demographics. A number of techniques are being developed to identify subscriber characteristics, and are discussed in U.S. patent application Ser. No. 09/205,653, filed on Dec. 3, 1998, entitled "Subscriber Characterization System," of which Charles A. Eldering and M. Lamine Sylla are the inventors, with an attorney docket number of T702, which is incorporated herein by reference but is not admitted to be prior art.

Even when subscriber characterizations can be performed, it is often the case that the television/set-top or personal computer that is receiving the programming is used by several members of a household. Given that these members of the household can have very different demographic characteristics and product preferences, it is important to be able to identify which subscriber is utilizing the system. Additionally, it would be useful to be able to utilize previous characterizations of a subscriber, once that subscriber is identified from a group of users.

For the foregoing reasons, there is a need for a subscriber identification system which can identify a subscribers in a household or business and retrieve previous characterizations.

SUMMARY OF THE INVENTION

The present invention encompasses a system for identifying a particular subscriber from a household or business.

The present invention encompasses a method and apparatus for identifying a subscriber based on their particular viewing and program selection habits. As a subscriber enters channel change commands in a video or computer system, the sequence of commands entered and programs selected are recorded, along with additional, information which can include the volume level at which a program is listened. In a preferred embodiment, this information is used to form a session data vector which can be used by a neural network to identify the subscriber based on recognition of that subscribers traits based on previous sessions.

In an alternate embodiment, the content that the subscriber is viewing, or text associated with the content, is mined to produce statistical information regarding the programming including the demographics of the target audience and the type of content being viewed. This program related information is also included in the session data vector and is used to identify the subscriber.

In one embodiment, subscriber selection data are processed using a Fourier transform to obtain a signature for each session profile wherein the session profile comprises a probabilistic determination of the subscriber demographic data and the program characteristics. In a preferred embodiment a classification system is used to cluster the session profiles wherein the classification system groups the session profiles having highly correlated signatures and wherein a group of session profiles is associated with a common identifier derived from the signatures.

In a preferred embodiment, the system identifies a subscriber by correlating a processed version of the subscriber selection data with the common identifiers of the subscriber profiles stored in the system.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 3 shows an example of a session data vector;

FIG. 8 shows examples of fuzzy logic rules;

FIG. 10 shows a pseudo-code for implementing the identification process of the present invention.

DETAILED DESCRIPTION OF THE PREFERRED EMBODIMENT

Figure 1:
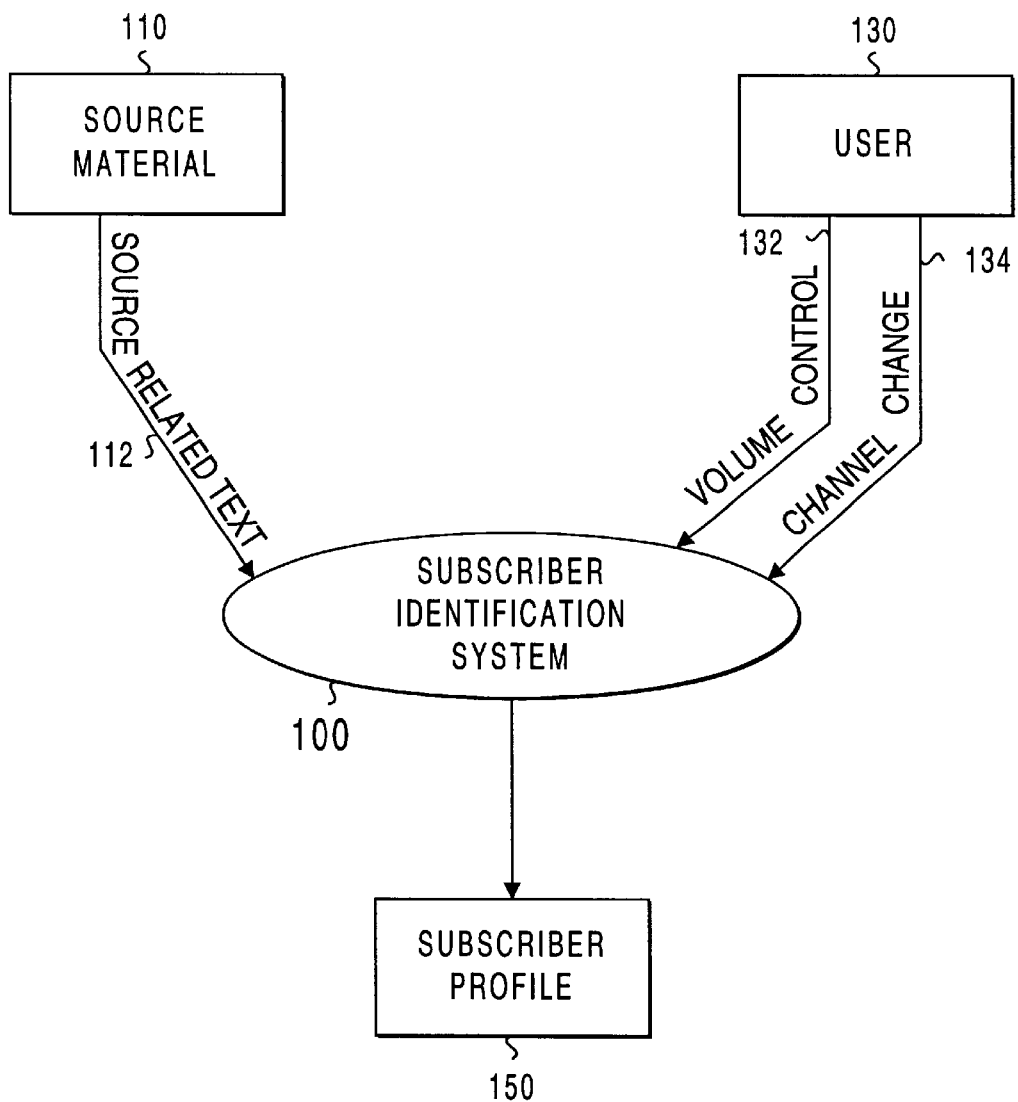
FIG. 1 illustrates a context diagram of the subscriber identification system.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the apparatus of the present invention is disclosed.

The present invention is directed at a method and apparatus for determining which subscriber in a household or business is receiving and selecting programming.

FIG.1 shows a context diagram of a subscriber identification system 100. The subscriber identification system 100 monitors the activity of a user 130 with source material 110, and identifies the user 130 by selecting the appropriate subscriber profile 150 from the set of subscriber profiles stored in the system. The source material 110 is the content that a user 130 selects, or text associated with the source material. Source material 110 may be, but is not limited to, a source related text 112 embedded in video or other type of multimedia source material including MPEG source material or HTML files. Such text may derive from electronic program guide or closed captioning.

The activities of the user 130 include channel changes 134 and volume control signals 132. Subscriber identification system 100 monitors channel changes 134 as well as volume control signals activities, and generates session characteristics which describe the program watched during that session. The description of the program being watched during that session includes program characteristics such as program category, sub-category and a content description, as well as describing the target demographic group in terms of age, gender, income and other data.

Figure 2:
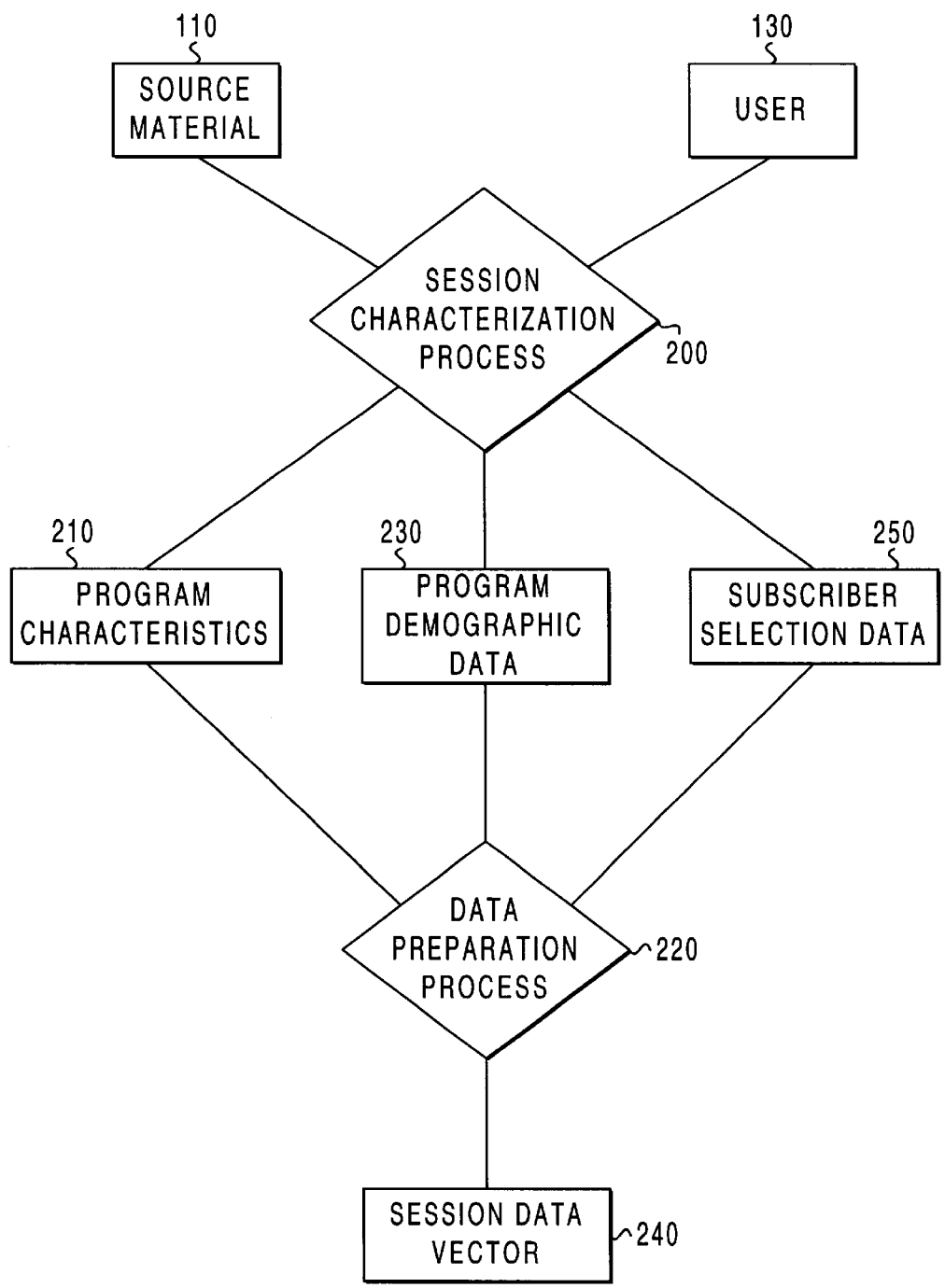
FIG. 2 illustrates an entity-relationship for the generation of a session data vector.

A session characterization process 200 is described in accordance with FIG. 2. A session data vector 240 which is derived in the session characterization process 200 is presented to a neural network 400, to identify the user 130. Identifying a user 130, in that instance, means determining the subscriber profile 150. The subscriber profile 150 contains probabilistic or deterministic measurements of an individual's characteristics including age, gender, and program and product preferences.

As illustrated in FIG. 2, a session data vector 240 is generated from the source material 110 and the activities of user 130. In a first step, the activities and the source material 110 are presented to the session characterization process 200. This process determines program characteristics 210, program demographic data 230 and subscriber selection data (SSD) 250.

The program characteristics 210 consist of the program category, subcategory and content description. These characteristics are obtained by applying the method described in the co-pending application entitled "Subscriber characterization system," previously referenced and incorporated herein.

The program demographic data 230 describes the demographics of the group at which the program is targeted. The demographic characteristics include age, gender and income but are not necessarily limited to.

The subscriber selection data 250 is obtained from the monitoring system and includes details of what the subscriber has selected including the volume level, the channel changes 134, the program title and the channel ID.

As illustrated in FIG. 2, the output of the session characterization process 200 is presented to a data preparation process 220. The data are processed by data preparation process 220 to generate a session data vector 240 with components representing the program characteristics 210, the program demographic data 230 and the subscriber selection data 250.

An example of session data vector is illustrated in FIG. 3. Session data vector 240 in FIG. 3 summarizes the viewing session of an exemplary subscriber. The components of the vector provide a temporal profile of the actions of that subscriber.

Figure 4:
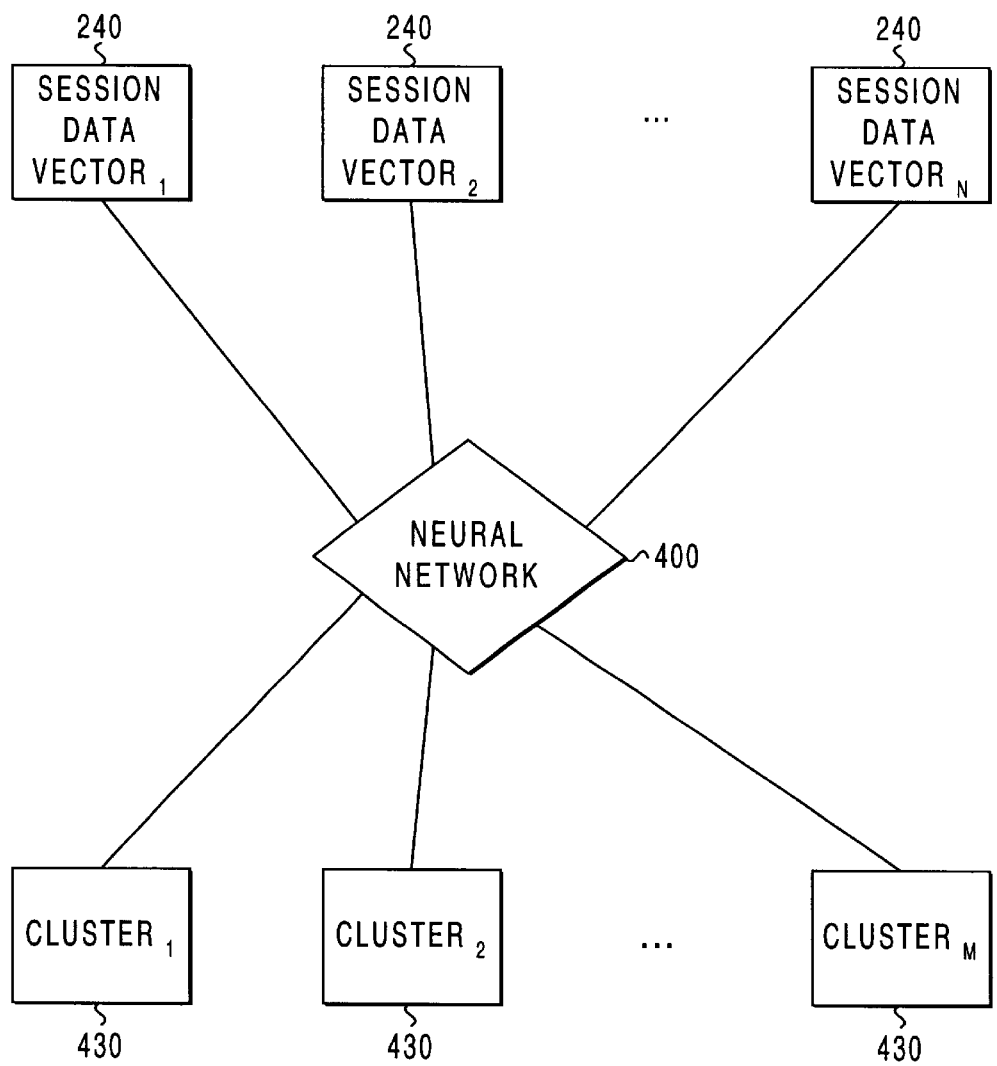
FIG. 4 shows, in entity relationship form, the learning process of the neural network.

FIG. 4 illustrates the learning process of a neural network 400 which, in a preferred embodiment, can be used to process session data vectors 240 to identify a subscriber. As illustrated in FIG. 4, N session data vectors 240 are obtained from the data preparation process 220. Each session data vector 240 comprises characteristics specific to the viewer. These characteristics can be contained in any one of the vector components. As an example, a particular subscriber may frequently view a particular sit-com, reruns of a sit-com, or another sit-com with similar target demographics. Alternatively, a subscriber may always watch programming at a higher volume than the rest of the members of a household, thus permitting identification of that subscriber by that trait. The time at which a subscriber watches programming may also be similar, so it is possible to identify that subscriber by time-of-day characteristics.

By grouping the session data vectors 240 such that all session data vectors with similar characteristics are grouped together, it is possible to identify the household members. As illustrated in FIG. 4, a cluster 430 of session data vectors 240 is formed which represents a particular member of that household.

In a preferred embodiment, a neural network 400 is used to perform the clustering operation. Neural network 400 can be trained to perform the identification of a subscriber based on session data vector 240. In the training session N samples of session data vectors 240 are separately presented to the neural network 400. The neural network 400 recognizes the inputs that have the same features and regroup them in the same cluster 430. During this process, the synaptic weights of the links between nodes is adjusted until the network reaches its steady-state. The learning rule applied can be a competitive learning rule where each neuron represents a particular cluster 430, and is thus "fired" only if the input presents the features represented in that cluster 430. Other learning rules capable of classifying a set of inputs can also be utilized. At the end of this process, M clusters 430 are formed, each representing a subscriber.

Figure 5:
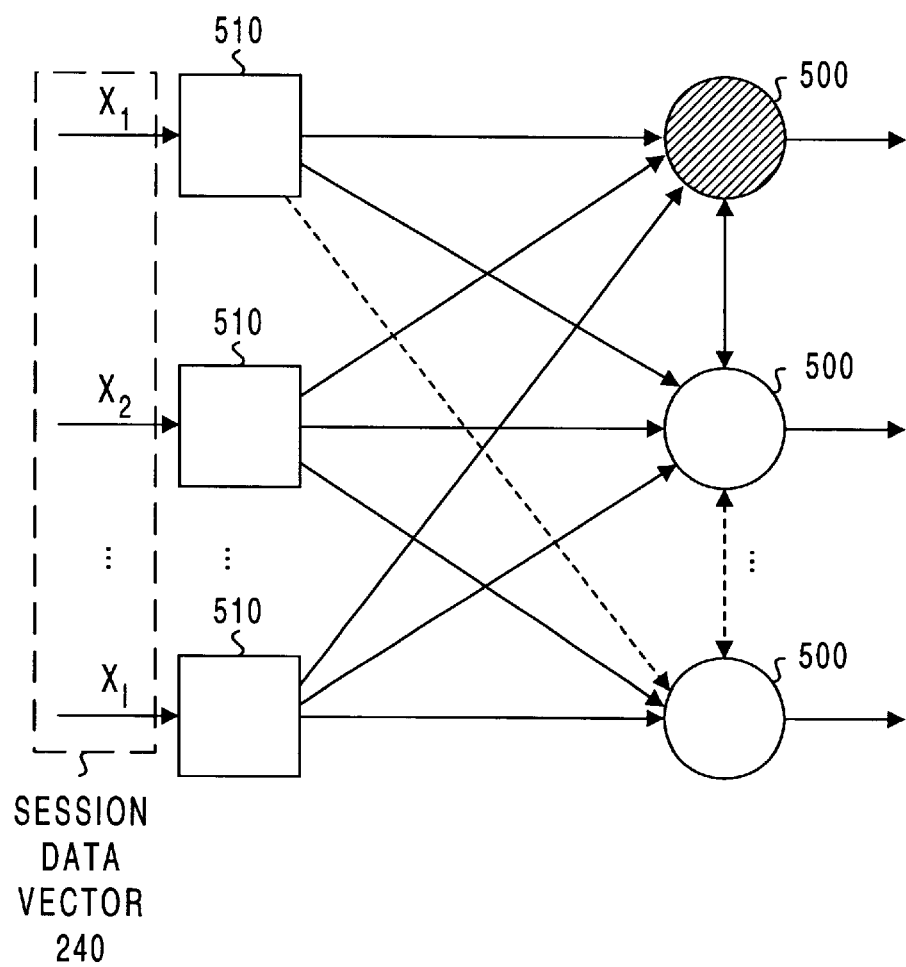
FIG. 5 illustrates competitive learning.

In FIG. 5 an example of competitive single-layer neural network is depicted. Such a neural network can be utilized to realize neural network 400. In a preferred embodiment a shaded neuron 500 is "fired" by a pattern. The input vector, in this instance a session data vector 240, is presented to input nodes 510. The input is then recognized as being a member of the cluster 430 associated with the shaded neuron 500.

In one embodiment, The subscriber selection data 250, which include the channel changes and volume control are further processed to obtain a signature. The signature is representative of the interaction between the subscriber and the source material 110. It is well known that subscribers have their own viewing habits which translates into a pattern of selection data specific to each subscriber. The so called "zapping syndrome" illustrates a particular pattern of selection data wherein the subscriber continuously changes channels every 1–2 minutes.

Figure 6A:
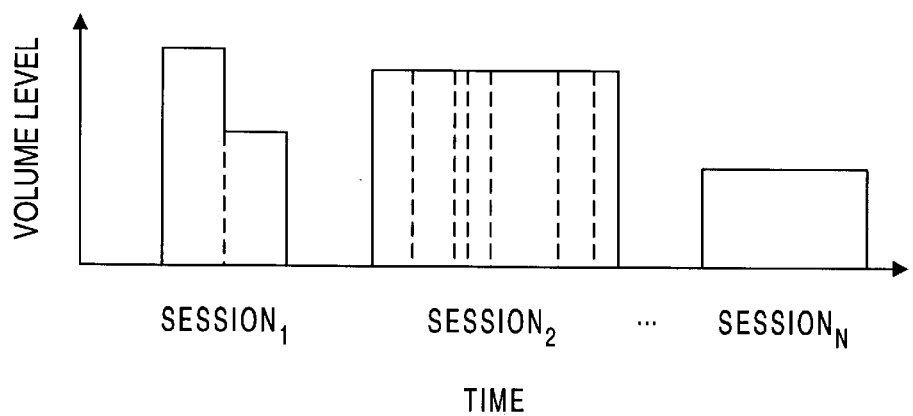
FIGS. 6A–6G represent a session profile.
Figure 6B:
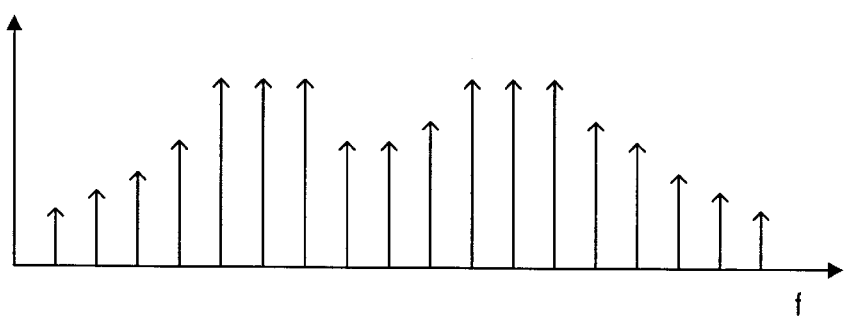

In a preferred embodiment, the signature is the Fourier transform of the signal representing the volume control and channel changes. The volume control and channel changes signal is shown in FIG. 6A, while the signature is illustrated in FIG. 6B. Those skilled in the art will recognize that the volume control and channel changes signal can be represented by a succession of window functions or rectangular pulses, thus by a mathematical expression. The channel changes are represented by a brief transition to the zero level, which is represented in FIG. 6A by the dotted lines.

The discrete spectrum shown in FIG. 6B can be obtained from the Digital Fourier Transform of the volume and channel changes signal. Other methods for obtaining a signature from a signal are well known to those skilled in the art and include wavelet transform.

Figure 6C:
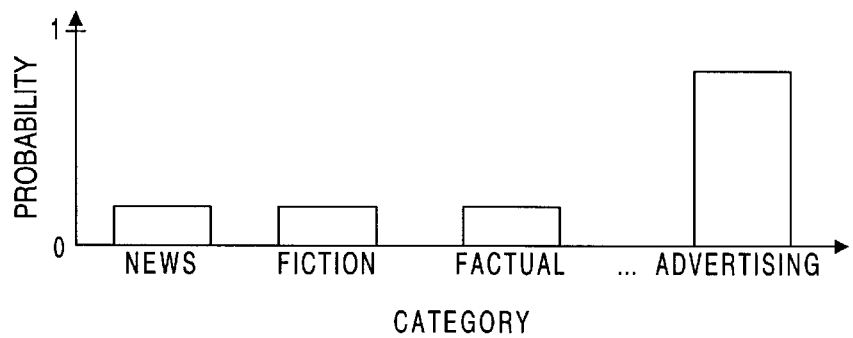
Figure 6D:
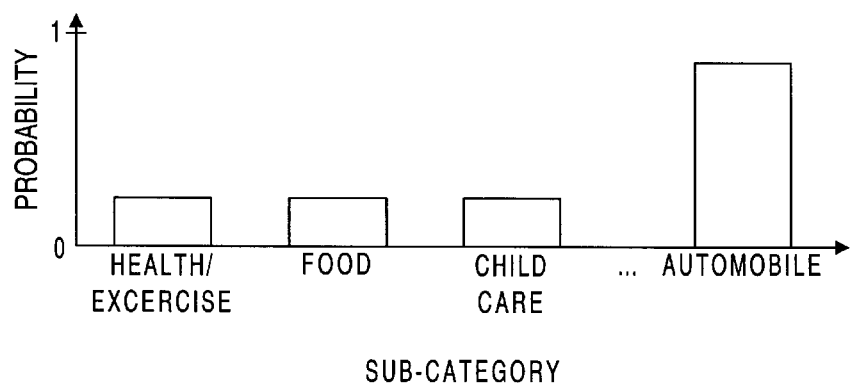
Figure 6E:
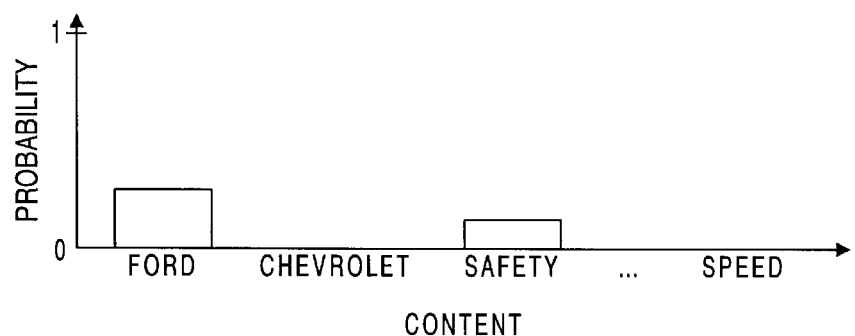

In this embodiment of the present invention, the signature is combined with the program demographic data 230 and program characteristics 210 to form a session profile which is identified by the signature signal. The program demographic data 230 and program characteristics 210 are represented in FIGS. 6C through 6G. FIG. 6C represents the probabilistic values of the program category. FIGS. 6D and 6E represent the probabilistic values of the program sub-category and program content, respectively.

Figure 6F:
Figure 6G:
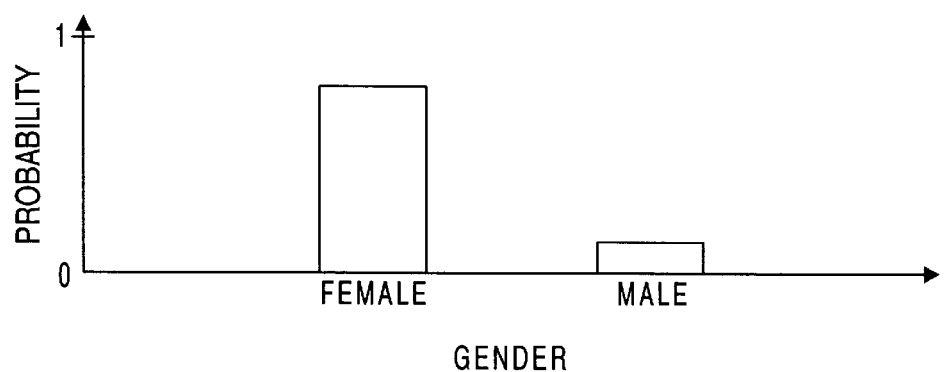

The program demographic data 230, which include the probabilistic values of the age and gender of the program recipients are illustrated in FIGS. 6F and 6G respectively.

Figure 7:
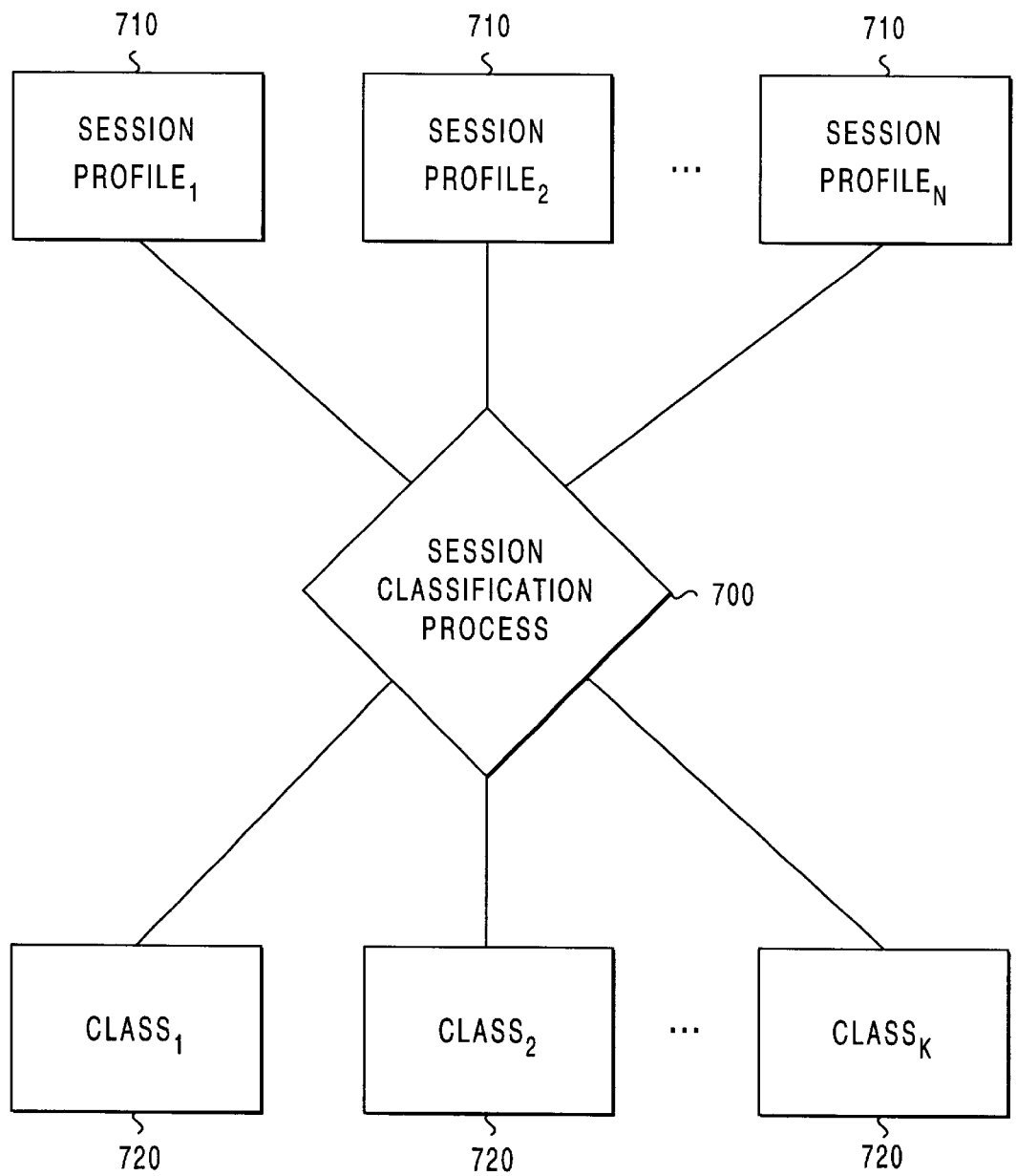
FIG. 7 represents an entity relationships for classifying the sessions profiles.

FIG. 7 illustrates the entity relationship for classifying the session based on the signature signal. In this embodiment, sessions having the same signature are grouped together. Session classification process 700 correlates the signature of different session profiles 710 and groups the sessions having highly correlated signatures into the same class 720. Other methods used in pattern classification can also be used to classify the session into classes. In this embodiment, each class 720 is composed by a set of session profiles with a common signature. The set of session profiles within a class can be converted into a subscriber profile by averaging the program characteristics 210 and the program demographic data 230 of the session profiles within the set. For example, the probabilistic values of the program category would be the average of all the probabilistic values of the program category within the set.

In one embodiment, a deterministic representation of the program demographic data 230 can be obtained by use of fuzzy logic rules inside the common profile. Examples of rules that can be applied to the common profile are presented in FIG. 8. In this embodiment, the program demographic data are probabilistic values, which describe the likelihood of a subscriber to be part of a demographic group. As an example, the demographic data can contain a probability of 0.5 of the subscriber being a female and 0.5 of being a male. By use of fuzzy logic rules such as those shown in FIG. 8, these probabilistic values can be combined with the probabilistic values related to program characteristics 210 to infer a crisp value of the gender. Fuzzy logic is generally used to infer a crisp outcome from fuzzy inputs wherein the inputs values can take any possible values within an interval [a,b].

The subscriber profile obtained from a set of session profiles within a class is associated with a common identifier which can be derived from the averaging of signatures associated with the session profiles within that class. Other methods for determining a common signature from a set of signatures can also be applied. In this instance, the common identifier is called the common signature.

In an alternate embodiment, the subscriber profile 150 is obtained through a user-system interaction, which can include a learning program, wherein the subscriber is presented a series of questions or a series of viewing segments, and the answers or responses to the viewing segments are recorded to create the subscriber profile 150.

In yet another embodiment, the subscriber profile 150 is obtained from a third source which may be a retailer or other data collector which is able to create a specific demographic profile for the subscriber.

In one embodiment, the subscriber profile 150 is associated with a Fourier transform representation of the predicted viewing habits of that subscriber which is created based on the demographic data and viewing habits associated with users having that demographic profile. As an example, the demonstrated correlation between income and channel change frequency permits the generation of a subscriber profile based on knowledge of a subscriber's income. Using this methodology it is possible to create expected viewing habits which form the basis for a common identifier for the subscriber profile 150.

Figure 9:
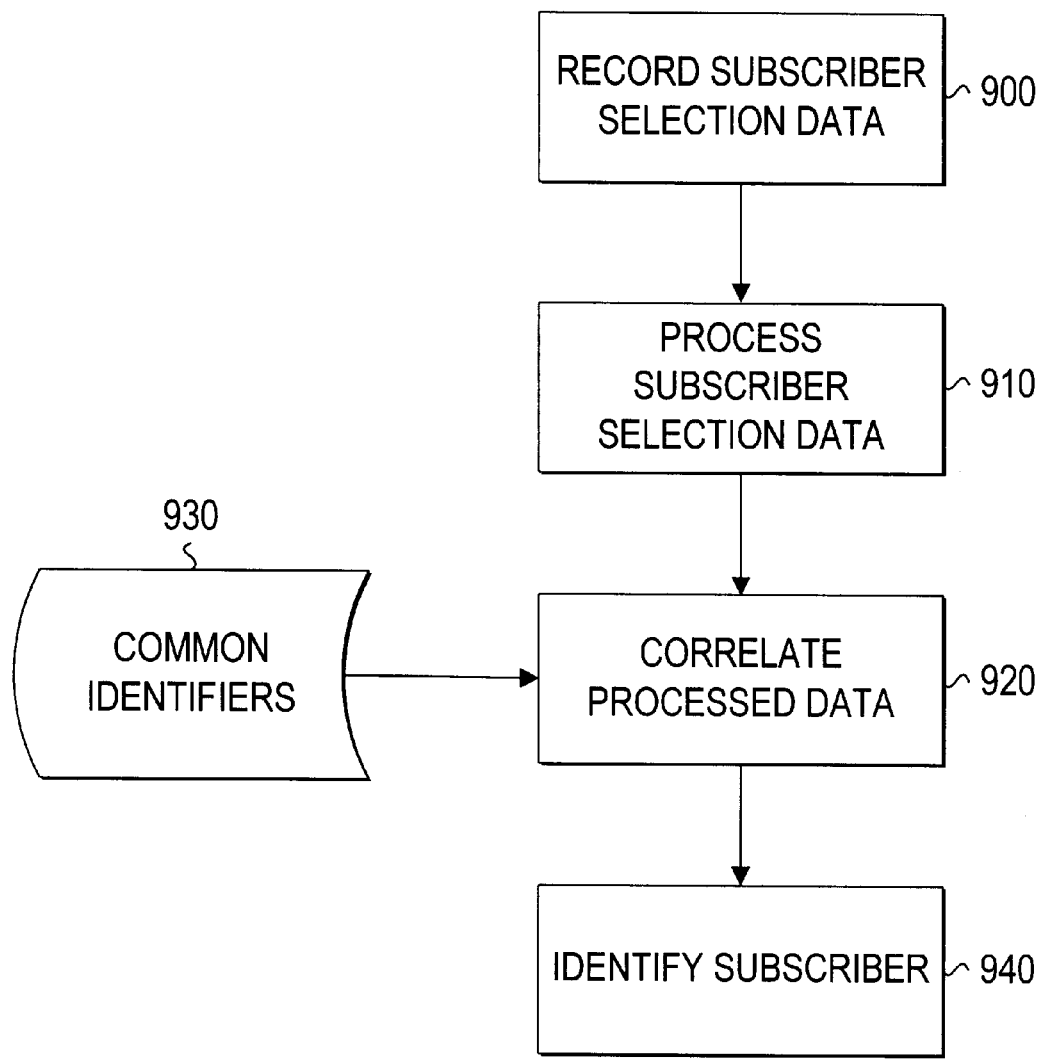
FIG. 9 shows a flowchart for identifying a subscriber.

FIG. 9 illustrates a subscriber identification process wherein the subscriber selection data 250 are processed and correlated with stored common identifiers 930 to determine the subscriber most likely to be viewing the programming. As illustrated in FIG. 9, the subscriber selection data 250 are recorded at record SSD step 900. In a preferred embodiment, the subscriber selection data 250 are the combination of channel changes and volume controls. Alternatively, channel changes signal or volume control signal is used as SSD. At process data step 910, a signal processing algorithm can be used to process the SSD and obtain a processed version of the SSD. In one embodiment, the signal processing algorithm is based on the use of the Fourier transform. In this embodiment, the Fourier transform represents the frequency components of the SSD and can be used as a subscriber signature. At correlate processed SSD step 920 the processed SSD obtained at process SSD step 910 is correlated with stored common identifiers 930. Stored common identifiers 930 are obtained from the session classification process 700 described in accordance with FIG. 7. The peak correlation value allows determining which subscriber is most likely to be viewing the programming. At identify subscriber step 940, the subscriber producing the subscriber selection data 250 is then identified among a set of subscribers.

In one embodiment, the system can identify the subscriber after 10 minutes of program viewing. In this embodiment, a window function of length 10 minutes is first applied to subscriber selection data 250 prior to processing by the signal processing, algorithm. Similarly, in this embodiment, the stored common identifiers 930 are obtained after applying a window function of the same length to the subscriber selection data 250. The window function can be a rectangular window, or any other window function that minimizes the distortion introduced by truncating the data. Those skilled in the art can readily identify an appropriate window function.

Alternatively, the identification can be performed after a pre-determined amount of time of viewing, in which case the length of the window function is set accordingly.

In the present invention, the learning process or the classification process can be reset to start a new learning or classification process. In one embodiment using Fourier transform and correlation to identify the subscriber, a reset function can be applied when the correlation measures between stored common identifiers 930 and new processed SSD become relatively close.

As previously discussed, identifying an individual subscriber among a set of subscribers can be thought as finding a subscriber profile 150 whose common identifier is highly correlated with the processed selection data of the actual viewing session.

FIG. 10 illustrates a pseudo-code that can be used to implement the identification process of the present invention. As illustrated in FIG. 10, the subscriber selection data 250 of a viewing session are recorded. The subscriber selection can be a channel change sequence, a volume control sequence or a combination of both sequences. A Fourier transformation is applied to the sequence to obtain the frequency components of the sequence which is representative of the profile of the subscriber associated with the viewing session. In a preferred embodiment, the Fourier transform F_T_SEQ is correlated with each of the N common identifiers stored in the system. As illustrated in FIG. 10, the maximum correlation value is determined and its argument is representative of the identifier of the subscriber profile 150.

Although this invention has been illustrated by reference to specific embodiments, it will be apparent to those skilled in the art that various changes and modifications may be made which clearly fall within the scope of the invention. In particular, the examples of a neural network and Fourier transform are not intended as a limitation. Other well known methods can also be used to implement the present invention. A number of neural network, fuzzy logic systems and other equivalent systems can be utilized and are well known to those skilled in the art. Additional examples of such alternate systems for realizing neural network 400 are described in the text entitled "Neural Networks, a Comprehensive Foundation," by Simon Haykin, and in "Understanding Neural Networks and Fuzzy Logic," by Stamatios V. Kartalopoulos, both of which are incorporated herein by reference.

The invention is intended to be protected broadly within the spirit and scope of the appended claims.

What is claimed is:

1. In a telecommunications environment comprising a delivery network for delivering content and a residential unit for receiving the content and interacting with a subscriber, the residential unit including at least a storage medium and a processor, a computer implemented method of associating a subscriber interacting with the residential unit with characteristics that are not directly related to interactions of the subscriber with the residential unit, the method comprising utilizing the processor to:

monitor subscriber interactions with the residential unit;

process at least a portion of the subscriber interactions to generate a session profile, wherein the session profile is generated without knowledge of the identity of the subscriber and identifies subscriber traits including traits that are not directly associated with the subscriber interactions;

compare at least a portion of the session profile with at least a portion of subscriber profiles stored in the storage medium, the subscriber profiles being a compilation of session profiles generated over multiple interaction sessions without knowledge of the identity of the subscriber that have been grouped together based on similarities, the subscriber profiles identifying subscriber characteristics that are a compilation of subscriber traits from the session profiles grouped together, the subscriber characteristics including characteristics that are not directly associated with the subscriber interactions; and associate, based on similarities between the subscriber profile and the session profile, tile subscriber with one of the subscriber profiles and the subscriber characteristics including the characteristics that are not directly associated with the subscriber interactions.

2. The method of claim 1, wherein the subscriber traits and the subscriber characteristics include probabilistic demographics associated with the subscriber.

3. The method of claim 2, wherein said comparing includes comparing at least some subset of the probabilistic demographic characteristics of the subscriber within the session profile with similar attributes in the subscriber profiles.

4. The method of claim 1, wherein the subscriber traits and the subscriber characteristics include probabilistic program characteristics associated with the subscriber.

5. The method of claim 4, wherein said comparing includes comparing at least some subset of the probabilistic program characteristics associated with the subscriber within the session profile with similar attributes in the subscriber profiles.

6. The method of claim 1, wherein the subscriber traits and the subscriber characteristics include subscriber selection data.

7. The method of claim 6, wherein the subscriber selection data includes at least some subset of channel changes and volume changes.

8. The method of claim 6, wherein said comparing includes comparing at least some subset of the subscriber selection data within the session profile with similar attributes in the subscriber profiles.

9. The method of claim 1, wherein the subscriber traits and the subscriber characteristics include a subscriber signature.

10. The method of claim 9, wherein the subscriber signature is a discrete spectrum representation of at least some subset of the subscriber interactivity.

11. The method of claim 10, wherein the at least some subset of the subscriber interactivity used to generate the subscriber signature includes channel changes.

12. The method of claim 10, wherein the at least some subset of the subscriber interactivity used to generate the subscriber signature includes volume control.

13. The method of claim 9, wherein the subscriber signature is a Fourier transform of at least some subset of the subscriber interactivity.

14. The method of claim 9, wherein said comparing includes comparing the subscriber signature within the session profile with similar attributes in the subscriber profiles.

15. The method of claim 1, wherein said comparing is performed by a neural network.

16. The method of claim 1, wherein each subscriber profile represents a different device interactivity identity.

17. The method of claim 1, wherein the session profiles are clustered based on similar subscriber signatures in order to generate the subscriber profiles.

18. The method of claim 17, wherein the subscriber signatures are a discrete spectrum representation of at least some subset of the subscriber interactivity.

19. The method of claim 1, wherein the session profiles are clustered based on similarities between at least some subset of probabilistic demographic characteristics, probabilistic program characteristics, and subscriber selection data in order to generate the subscriber profiles.

20. The method of claim 1, wherein the device is a television.

21. The method of claim 1, further comprising retrieving program data associated with content selected within the subscriber interactivity.

22. The method of claim 21, wherein the program data defines at least some subset of program characteristics and program demographics.

23. The method of claim 21, wherein the program data is obtained by context mining textual information associated with the selected content.

24. The method of claim 23, wherein the textual information includes at least some subset of an electronic program guide, closed caption data, and an HTML file.

25. The method of claim 1, further comprising clustering the session profiles based on similarities between at least one identified subscriber trait to form subscriber profiles.

26. The method of claim 1, wherein each of the subscriber profiles may be associated with one or more market segments, each market segment being associated with one or more of the plurality of subscriber traits.

27. The method of claim 26, further comprising associating the subscriber with at least one market segment.

28. A system for associating a subscriber interacting with a device with characteristics that are not directly associated with device interactions or the subscriber, the system comprising:

the device;

a subscriber interface device for interacting with the device;

a storage medium; and a processor for:

monitoring subscriber interactivity with the device;

processing at least a portion of the subscriber interactivity to generate a session profile, wherein the session profile is generated with no knowledge of the identity of the subscriber and identifies subscriber traits including traits that are not directly associated with the subscriber interactivity;

comparing at least a portion of the session profile with at least a portion of subscriber profiles, the subscriber profiles being a compilation of session profiles generated over multiple interaction sessions with no knowledge of the identity of the subscriber that have been grouped together based on similarities, the subscriber profiles identifying subscriber characteristics that are a compilation of subscriber traits from the session profiles grouped together, the subscriber characteristics including characteristics that are not directly associated with the subscriber interactivity; and associating, based on similarities between the subscriber profile and the session profile, the subscriber with one of the subscriber profiles and the subscriber characteristics including the characteristics that are not directly associated with the subscriber interactivity.

29. The system of claim 28, further comprising a delivery network for delivering content to the device responsive to said subscriber interface.

30. The system of claim 28, wherein said processor compares the session profile with the subscriber profiles by using a neural network.

31. The system of claim 28, wherein said processor generates a session profile that includes probabilistic demographic characteristics and compares at least some subset of the probabilistic demographic characteristics of the subscriber included within the session profile with similar attributes in the subscriber profiles.

32. A The system of claim 28, wherein said processor generates a session profile that includes probabilistic program characteristics and compares at least some subset of the probabilistic program characteristics of the subscriber included within the session profile with similar attributes in the subscriber profiles.

33. The system of claim 28, wherein said processor generates a session profile that includes subscriber selection data and compares at least some subset of the subscriber selection data included within the session profile with similar attributes in the subscriber profiles.

34. The system of claim 28, wherein said processor generates a session profile that includes a subscriber signature and compares the subscriber signature included within the session profile with similar attributes in the subscriber profiles.

35. The system of claim 34, wherein tile subscriber signature is a discrete spectrum representation of at least some subset of the subscriber interactivity.

36. The system of claim 28, wherein each of the subscriber profiles represents a different device interactivity identity.

37. The system of claim 28, wherein said processor clusters the session profiles based on similar subscriber signatures in order to generate the subscriber profiles.

38. The system of claim 28, wherein said processor clusters the session profiles based on similarities between at least some subset of probabilistic demographic characteristics, probabilistic program characteristics, and subscriber selection data in order to generate the subscriber profiles.

39. The system of claim 28, wherein said processor
retrieves program data associated with the content delivered from the content provider; and
generates the session profile based on the program data and the subscriber interactivity.

40. An apparatus for associating a subscriber interacting with a device with characteristics that are not directly associated with device interactions of the subscriber, the apparatus comprising:

a subscriber interface for receiving subscriber interactions;

a content interface for receiving content from a content provider responsive to said subscriber interface;

a storage medium; and a processor for:
processing at least a portion of the subscriber interactivity to generate a session profile, wherein the session profile is generated with no knowledge of the identity of the subscriber and identifies subscriber traits and at least some of the subscriber traits are discretionary traits that are not directly associated with the subscriber interactivity;

comparing at least a portion of the session profile with at least a portion of subscriber profiles, the subscriber profiles are generated with no knowledge of the identity of the subscriber and are a compilation of session profiles generated over multiple interaction sessions that have been grouped together based on similarities, the subscriber profiles identifying subscriber characteristics that are a compilation of subscriber traits from the session profiles grouped together, the subscriber characteristics including characteristics that are not directly associated with the subscriber interactivity; and associating, based on similarities between the subscriber profiles and the session profile, the subscriber with one of the subscriber profiles and the subscriber characteristics including the characteristics that are not directly associated with the subscriber interactivity.

41. The apparatus of claim 40, wherein said processor compares the session profile with subscriber profiles by using a neural network.

42. The apparatus of claim 40, wherein said processor
generates a session profile that includes at least some subset of probabilistic demographic characteristics, probabilistic program characteristics, subscriber selection data and subscriber signature; and
compares attributes within the session profile with similar attributes in the subscriber profiles.

43. The apparatus of claim 40, wherein said processor
retrieves program data associated with the content received from the content provider, and
generates the session profile based on the program data and the subscriber interactions.

44. An apparatus for associating a subscriber interacting with a device with characteristics that are not directly associated with device interactions of the subscriber, the apparatus comprising:

a subscriber interface for receiving subscriber interactions;

a content interface for delivering content to subscribers;

a storage medium; and a processor for:
processing at least a portion of the subscriber interactivity to generate a session profile, wherein the session profile is generated with no knowledge of the identity of the subscriber and identifies subscriber traits and at least some of the subscriber traits are discretionary traits that are not directly associated with the subscriber interactivity;

comparing at least a portion of the session profile with at least a portion of subscriber profiles, the subscriber profiles being a compilation of session profiles generated over multiple interaction sessions that have been grouped together based on similarities, the subscriber profiles identifying subscriber characteristics that are a compilation of subscriber traits from the session profiles grouped together, the subscriber characteristics including characteristics that are not directly associated with the subscriber interactivity; and associating, based on similarities between the subscriber profiles and the session profile, the subscriber with one of the subscriber profiles and the subscriber characteristics including the characteristics that are not directly associated with the subscriber interactivity.

45. The apparatus of claim 44, wherein said processor generates a session profile that includes at least some subset of probabilistic demographic characteristics, probabilistic program characteristics, subscriber selection data and subscriber signature; and compares attributes within die session profile with similar attributes in the subscriber profiles.

46. The apparatus of claim 44, wherein said processor retrieves program data associated with content selected by the subscriber; and generates the session profile based on the program data and the subscriber interactions.

47. A computer program embodied on a computer-readable medium for associating a subscriber interacting with a device with characteristics that are not directly associated with device interactions of the subscriber, said computer program comprising:

a source code segment for monitoring subscriber interactivity;

a source code segment for processing at least a portion of the subscriber interactivity to generate a session profile, wherein the session profile is generated with no knowledge of the identity of the subscriber and identifies subscriber traits and at least some of the subscriber traits are discretionary traits that are not directly associated with the subscriber interactivity;

a source code segment for comparing at least a portion of the session profile with at least a portion of subscriber profiles, the subscriber profiles being a compilation of session profiles generated over multiple interaction sessions that have been grouped together based on similarities, the subscriber profiles identifying subscriber characteristics that are a compilation of subscriber traits from the session profiles grouped together, the subscriber characteristics including characteristics that are not directly associated with the subscriber interactivity; and a source code segment for associating, responsive to said source code segment for comparing, the subscriber with one of the subscriber profiles and the subscriber characteristics including the characteristics that are not directly associated with the subscriber interactivity.

48. The computer program of claim 47, wherein said source code segment for processing the subscriber interactions includes:

a source code segment for extracting program data from content selected as part of the subscriber interactivity; and a source code segment for generating the session profile based on the subscriber interactivity and the program data.

49. The computer program of claim 47, wherein said source code segment for processing includes a source code segment for processing volume and channel change commands monitored as part of the subscriber interactions to generate a subscriber signature that is part of the session profile.

50. The computer program of claim 49, wherein said source code segment for processing volume and channel change commands utilizes a Fourier transform.

51. The computer program of claim 47, wherein the device is a television.

52. The computer program of claim 51, wherein the computer program is implemented within a set-top box connected to the television.

53. The computer program of claim 51, wherein the computer program is implemented within a television access network.

54. The computer program of claim 47, wherein the computer program is implemented as a client-server architecture.

55. The a telecommunications environment comprising a delivery network for delivering content and a residential unit for receiving the content and interacting with a subscriber, the residential unit including at least a storage medium and a processor, a computer implemented system for associating a subscriber interacting with the residential unit with characteristics that are not directly associated with interactions of the subscriber with the residential unit, the system comprising:

means for monitoring subscriber interactions;

means for processing at least a portion of the subscriber interactions to generate a session profile, wherein the session profile is generated without knowledge of the identity of the subscriber and identifies subscriber traits and at least some of the subscriber traits are discretionary traits that are not directly associated with the subscriber interactions, wherein said means for processing utilizes the processor;

means for comparing at least a portion of the session profile with at least a portion of subscriber profiles stored in the storage medium, the subscriber profiles being a compilation of session profiles generated over multiple interaction sessions that have been grouped together based on similarities, the subscriber profiles identifying subscriber characteristics that are a compilation of subscriber traits from the session profiles grouped together, the subscriber characteristics including characteristics that are not directly associated with the subscriber interactions; and means for associating, responsive to said means for comparing, the subscriber with one of the subscriber profiles and the subscriber characteristics including the characteristics that are not directly associated with the subscriber interactions.

56. The system of claim 55, wherein said means for processing the subscriber interactions includes:

means for extracting program data from content selected as part of the subscriber interactivity, and means for generating the session profile based on the subscriber interactivity and the program data.

57. The system of claim 55, wherein said means for processing includes means for processing volume and channel change commands monitored as part of the subscriber interactions to generate a subscriber signature that is part of the session profile.

58. The system of claim 57, wherein said means for processing volume and channel change commands utilizes a Fourier transform.

59. In a television network environment consisting of a display device, a storage medium, and a processor, a computer implemented method for associating traits to a television subscriber, the traits not being directly related to interactions of the television subscriber with a television, the method comprising:

monitoring subscriber interactions with the television for a plurality of viewing sessions;

utilizing the processor to process, for each viewing session, at least a portion of the subscriber interactions to create session profiles that identify traits about the subscriber including traits not directly associated with the interactions; wherein the session profiles do not include any data related to actual subscriber identity;

clustering the session profiles based on similarities between at least some portion of the session profiles to form subscriber profiles, wherein the subscriber profiles do not include any data related to actual subscriber identity and identity a plurality of traits that were identified in the clustered session profiles, the plurality of traits including traits not directly associated with the interactions;

comparing, for each viewing session, at least some portion of the session profile with a corresponding portion of the subscriber profiles, selecting, for each viewing session, a subscriber profile for the subscriber based on said comparing; and associating the plurality of traits associated with the subscriber profile to the subscriber including the traits not directly associated with the interactions.

60. The method of claim 59, wherein the plurality of traits include demographic traits.

61. In a television network environment consisting of a display device, a storage medium, and a processor, a computer implemented method for associating traits to a television subscriber, the traits not being directly related to interactions of the television subscriber with a television, the method comprising:

monitoring subscriber interactions with the television for a plurality of viewing sessions;

utilizing the processor to process, for each viewing session, at least a portion of the subscriber interactions to create session profiles that identify traits about the subscriber including traits not directly associated with the interactivity, wherein the session profiles are generated with no knowledge of subscriber identity;

clustering the session profiles based on similarities between at least some portion of the session profiles to form subscriber profiles, wherein the subscriber profiles are generated without knowledge of subscriber identity and identify a plurality of traits that were identified in the clustered session profiles, the plurality of traits including traits not directly associated with the interactions;

comparing, for each viewing session, at least some portion or the session profile with a corresponding portion of the subscriber profiles, selecting, for each viewing session, a subscriber profile for the subscriber based on said comparing; and associating the plurality of traits associated with the subscriber profile to the subscriber including the traits not directly associated with the interactions.

\* \* \* \* \*

UNITED STATES PATENT AND TRADEMARK OFFICE
CERTIFICATE OF CORRECTION

| | | |
|---|---|---|
| PATENT NO. | : 6,684,194 B1 | Page 1 of 1 |
| APPLICATION NO. | : 09/452893 | |
| DATED | : January 27, 2004 | |
| INVENTOR(S) | : Charles A. Eldering et al. | |

It is certified that error appears in the above-identified patent and that said Letters Patent is hereby corrected as shown below:

Column 7, line 38, delete "tile" and replace with --the--;

Column 9, line 50, delete "tile" and replace with --the--;

Column 11, line 25, delete "die" and replace with --the--;

Column 13, line 24, delete "identity" and replace with --identify--; second occurrence Signed and Sealed this Eleventh Day of September, 2007

JON W. DUDAS
*Director of the United States Patent and Trademark Office*